US007200168B1

(12) United States Patent
Fisher et al.

(10) Patent No.: US 7,200,168 B1
(45) Date of Patent: *Apr. 3, 2007

(54) STABLE OPERATION OF MEDIA GATEWAY

(75) Inventors: Abraham Fisher, Haifa (IL); Tal Shahar, Kiryat-Tivon (IL)

(73) Assignee: Surf Communication Solutions Ltd., Yokneam (IL)

( * ) Notice: Subject to any disclaimer, the term of this patent is extended or adjusted under 35 U.S.C. 154(b) by 1141 days.

This patent is subject to a terminal disclaimer.

(21) Appl. No.: 10/129,772

(22) PCT Filed: Nov. 9, 2000

(86) PCT No.: PCT/IL00/00733

§ 371 (c)(1),
(2), (4) Date: May 9, 2002

(87) PCT Pub. No.: WO01/35228

PCT Pub. Date: May 17, 2001

Related U.S. Application Data

(63) Continuation-in-part of application No. 08/969,981, filed on Nov. 13, 1997, now Pat. No. 6,792,039.

(30) Foreign Application Priority Data

| Nov. 11, 1999 | (IL) | .................................. 132888 |
| May 9, 2000 | (IL) | ..................... PCT/IL00/00266 |
| Nov. 1, 2000 | (IL) | ..................... PCT/IL00/00703 |

(51) Int. Cl.
*H04B 1/38* (2006.01)
*H04L 5/16* (2006.01)

(52) U.S. Cl. .................................................. 375/222

(58) Field of Classification Search ................ 375/222, 375/259, 260; 370/412–418; 379/266.08; 455/522

See application file for complete search history.

(56) References Cited

U.S. PATENT DOCUMENTS

| 4,965,641 A | 10/1990 | Blackwell et al. |
| 5,099,449 A | 3/1992 | Dombrosky et al. |

(Continued)

FOREIGN PATENT DOCUMENTS

EP 0 491 489 6/1992

(Continued)

OTHER PUBLICATIONS

Forney, D. G. Jr. et al.; "The V.34 High-Speed Modem Standard;" Dec. 1996; pp. 28-33; IEEE Communications Magazine.

(Continued)

*Primary Examiner*—Don N. Vo

(57) ABSTRACT

A method of scheduling a processor to handle a plurality of connections with respective processing cycles. The method includes estimating, for at least one of the connections, whether the connection will receive a processing session during its current respective processing cycle if each of the connections which did not yet receive a processing session during its current processing cycle receives, during its current processing cycle, an unlimited processing session and scheduling one or more of the connections that did not yet receive a processing session in their respective processing cycle, to perform a limited processing session, responsive to results of the estimation.

34 Claims, 4 Drawing Sheets

U.S. PATENT DOCUMENTS

| | | |
|---|---|---|
| 5,166,930 A | 11/1992 | Braff et al. |
| 5,386,517 A | 1/1995 | Sheth et al. |
| 5,491,691 A | 2/1996 | Shtayer et al. |
| 5,546,388 A | 8/1996 | Lin |
| 5,546,456 A * | 8/1996 | Vilsoet et al. ......... 379/266.08 |
| 5,563,885 A | 10/1996 | Witchey |
| 5,568,402 A | 10/1996 | Gray et al. |
| 5,590,345 A | 12/1996 | Barker et al. |
| 5,664,095 A | 9/1997 | Cox et al. |
| 5,712,851 A | 1/1998 | Nguyen et al. |
| 5,721,830 A | 2/1998 | Yeh et al. |
| 5,745,758 A | 4/1998 | Shaw et al. |
| 5,748,629 A | 5/1998 | Caldara et al. |
| 5,751,708 A | 5/1998 | Eng et al. |
| 5,790,781 A | 8/1998 | Cox et al. |
| 5,790,887 A | 8/1998 | Brech |
| 5,794,058 A | 8/1998 | Resnick |
| 5,799,064 A | 8/1998 | Sridhar et al. |
| 5,832,262 A | 11/1998 | Johnson et al. |
| 5,852,655 A | 12/1998 | McHale et al. |
| 5,905,725 A | 5/1999 | Sindhu et al. |
| 5,909,384 A | 6/1999 | Tal et al. |
| 5,917,824 A | 6/1999 | Brueckheimer et al. |
| 5,920,599 A | 7/1999 | Igarashi |
| 5,925,114 A | 7/1999 | Hoang |
| 5,931,950 A | 8/1999 | Hsu |
| 5,940,459 A | 8/1999 | Hsu et al. |
| 5,960,035 A | 9/1999 | Sridhar et al. |
| 5,982,776 A | 11/1999 | Manning et al. |
| 5,982,814 A | 11/1999 | Yeh et al. |
| 5,987,031 A | 11/1999 | Miller et al. |
| 5,995,540 A | 11/1999 | Draganic |
| 6,006,318 A | 12/1999 | Hansen et al. |
| 6,058,114 A | 5/2000 | Sethuram et al. |
| 6,115,360 A | 9/2000 | Quay et al. |
| 6,128,749 A | 10/2000 | McDonnell et al. |
| 6,148,006 A | 11/2000 | Dyke et al. |
| 6,157,963 A | 12/2000 | Courtright et al. |
| 6,160,843 A | 12/2000 | McHale et al. |
| 6,163,599 A | 12/2000 | McHale |
| 6,226,277 B1 | 5/2001 | Chuah |
| 6,262,989 B1 | 7/2001 | Gemar et al. |
| 6,353,616 B1 | 3/2002 | Elwalid et al. |
| 6,385,638 B1 | 5/2002 | Baker-Harvey |
| 6,385,673 B1 | 5/2002 | DeMoney |
| 6,457,037 B1 | 9/2002 | Maytal |
| 6,549,951 B1 | 4/2003 | Hui et al. |
| 6,577,871 B1 | 6/2003 | Budka et al. |
| 6,603,745 B1 | 8/2003 | Antonio et al. |
| 6,614,794 B1 | 9/2003 | Adas et al. |
| 6,832,096 B2 * | 12/2004 | Haim ..................... 455/522 |

FOREIGN PATENT DOCUMENTS

| | | |
|---|---|---|
| EP | 0 831 624 | 3/1998 |
| EP | 0 859 492 | 8/1998 |
| EP | 0 913 770 | 5/1999 |
| WO | WO 98/54868 | 12/1998 |
| WO | WO 99/06913 | 2/1999 |
| WO | WO 99/20033 | 4/1999 |
| WO | WO 99/39530 | 8/1999 |
| WO | WO 00/11843 | 3/2000 |

OTHER PUBLICATIONS

Eyuboglu, M. V. et al.; "Advanced Modulation Techniques for V.Fast;" May-Jun. 1993; pp. 243-256; European Trans. on Telecomm. and Related Tech.; vol. 4; No. 3.

Crovella, M. E. et al. for USENIX; Abstracts "Connection Scheduling in Web Servers;" last changed Sep. 23, 1999; 1 page retrieved from the internet on Jan. 30, 2002 <http://www.usenix.org./events/usits99/crovella.html>.

Gopalakrishnan, R. et al.; "Efficient User-Space Protocol Implementations with QoS Guarantees Using Real-Time Upcalls;" Aug. 4, 1998; pp. 374-388; IEEE/ACM Transactions on Networking; vol. 6; No. 4; XP000771968.

Held, G.; "The Complete Modem Reference;" John Wiley and Sons; pp. 260-262; XP002153737.

MacVittie, D. for Sun.com; "Best Practices How-Tos: Tuning your iPlanet[tm] Web Server;" Nov. 19, 2001; pp. 1-7; retrieved from the internet on Jan 24, 2002 <http://dcb.sun.com/practices/howtos/tuning_iplanet.jsp>.

Newton's Telecom Dictionary, the Official Dictionary of Telecommunications & the Internet; 15th Updated, Expanded and Much Improved Edition; Feb. 1999; pp. 645, 660; "RAC- Remote Access Concentrator" and "Remote Access Server".

Zeus Technology Inc.; Zeus Load Balancer v1.4; Chapter 1—Sizing Guide; retrieved from the internet on Jan. 24, 2002 <http://support.zeus.com/doc/zlb/sizing_guide.pdf>.

"T.38"; ITU-T Telecommunication Standardization Sector of ITU; Jun. 18, 1998; XP002163782.

Gieseler, S.; "Tunnelbau. Remote-Access-Server als Basis für Virtual Private Networks;" Net—Zeitschrift Fuer Kommunikationsmanagement, Huthig Verlag; vol. 52; No. 8/9; 1998; pp. 38-40; XP000782761.

* cited by examiner

STABLE OPERATION OF MEDIA GATEWAY

RELATED APPLICATIONS

This application is a U.S. national filing of PCT Application No. PCT/IL00/00733, filed Nov. 9, 2000. This application is also a continuation in part (CIP) of U.S. patent application Ser. No. 08/969,981, filed Nov. 13, 1997 now U.S. Pat. No. 6,792,039, the disclosure of which is incorporated herein by reference.

FIELD OF THE INVENTION

The present invention relates to communication systems and in particular to soft modems.

BACKGROUND OF THE INVENTION

Many providers of communication services employ a multi channel processing unit (MCPU) which includes, for example, a plurality of remote-access servers, such as modems, Fax handlers and voice Internet Protocol (VoIP) services connected to telephone switches. Some multi channel processing unit (MCPU), such as the Surf Multi-access Pool (SMP) available from Surf Communication Solutions Ltd., and servers of 3Com, Ascend, ADI, Connexent, Telogy, and Hothaus, are multi-channel software servers which have a capacity to handle concurrently, on a single processor, a plurality of connections. Generally, for each connection the MCPU runs a plurality of modules which perform the various tasks of handling the connection. The handling of each connection requires an amount of processing power which generally depends on the type of the connection handled (e.g., modem, fax, voice). The amount of processing power required by a specific connection may vary over time due to changes in the signal transmission rate or voice coder used on the connection, changes in the specific types of the connections handled by the MCPU and/or transient conditions such as the specific data sequence being transmitted. Since, it is generally not possible to predict the exact amount of processing power required on a specific connection, a commonly employed practice is to set for each processor a maximal number of connections it can handle based on a maximal processing power which may be required by each connection. This, however, results in a waste of processing power as at most times the utilization of the processor is much lower than its maximal capacity.

U.S. Pat. No. 5,995,540 to Draganic, the disclosure of which is incorporated herein by reference, describes a software modem executed on a general purpose computer. When the modem requires lower amounts of processing power, the excess processing power may be used by other tasks running on the general purpose computer.

SUMMARY OF THE INVENTION

As aspect of some embodiments of the present invention relates to assigning, to a single processor of a multi channel processing unit (MCPU), a number of connections to be handled, which number is beyond the operation capacity of the processor if all the connections require their maximal processing power consumption.

In exemplary embodiments of the invention, the number of the connections and/or the types of the connections handled by the processor is chosen such that on the average the processing power utilization of the connections may be handled by the processor. In those cases in which the connections handled by the processor require, together, more processing power than the processor has, the processing power utilization of one or more of the connections is reduced at the initiative of the MCPU. The processing power utilization is reduced, for example, by temporarily shutting down, by-passing and/or simplifying, for one or more of the connections, the operation of one or more of the modules generally used in handling the connection. The processing power reduction is performed such that ideally, the utilized processing power is within the capabilities of the processor. In some embodiments of the invention the shut down, by-pass and/or simplification of the one or more modules is performed in a manner which does not cause the connection to be terminated. Optionally, the shut down, by-pass and/or simplification are chosen in a manner which minimizes the time and/or extent of the reduction in the quality of the connection.

There is therefore provided in accordance with an embodiment of the invention, a method of scheduling a processor to handle a plurality of connections with respective processing cycles, including estimating, for at least one of the connections, whether the connection will receive a processing session during its current respective processing cycle if each of the connections which did not yet receive a processing session during its current processing cycle receives, during its current processing cycle, an unlimited processing session, and scheduling one or more of the connections that did not yet receive a processing session in their respective processing cycle, to perform a limited processing session, responsive to results of the estimation.

Possibly, estimating whether a connection will receive a processing session during its current respective processing cycle includes estimating a processing time required in a single session during a current respective processing cycle, for each of the connections which did not yet receive a processing session. In some embodiments of the invention, estimating the processing time required for each of the connections includes estimating responsive to types of the connections. Optionally, the scheduling of one or more of the connections to perform a limited processing session is performed such that the at least one of the connections will receive a processing session during its current respective processing cycle.

Optionally, estimating the processing time required for each of the connections includes estimating responsive to an actual time consumed by the connection in a previous processing cycle. In some embodiments of the invention, substantially all the connections have a common processing cycle. Optionally, the method includes managing a processor time cycle which is an integer multiple of the processing cycles of the connections.

In some embodiments of the invention, estimating whether the connections will receive a processing session during their current respective processing cycle includes comparing a time remaining to the end of the current processor time cycle to a sum of estimated times required for unlimited processing sessions of the connections which still require service during the current processor time cycle. Possibly, comparing the time remaining to the end of the current processor time cycle to the sum of required estimated times includes determining whether remaining time if greater, by at least a given safety margin, than the sum of required estimated times. In some embodiments of the invention, the given safety margin is a function of the remaining time until the end of the current processor time cycle.

Optionally, scheduling one or more of the connections to perform a limited processing session includes selecting the one or more sessions to perform a limited processing session responsive to a quality of service indication of the connections and/or responsive to which connections, if any, received a limited processing session during a previous processing cycle.

Alternatively or additionally, selecting the one or more sessions to perform a limited processing session includes selecting a connection which received a limited processing session during a previous processing cycle. Alternatively, selecting the one or more sessions to perform a limited processing session includes selecting a connection which did not receive a limited processing session during a previous processing cycle. Optionally, the method includes setting an order in which the connections receive processing sessions.

Optionally, the method includes changing the order in which the connections receive processing sessions so that a single connection will not receive more than a predetermined number of limited processing sessions within a predetermined period. In some embodiments of the invention, scheduling one or more of the connections to perform a limited processing session includes scheduling one or more of the connections to perform a processing session in which one or more of the tasks normally performed in an unlimited processing session of the connection is not performed.

In some embodiments of the invention, the one or more tasks not performed during the limited processing session include a task related to signal transmission, a task related to signal reception, a task of a data pump, a task of a decoding layer of a data pump and/or a task of an ECDC layer. Optionally, not performing one or more tasks during the limited processing session includes ignoring a percentage of received signals. In some embodiments of the invention, scheduling one or more of the connections to perform a limited processing session includes adjusting one or more parameters of the process handling. Optionally, adjusting one or more parameters includes reducing the length of a filter used in the processing.

There is further provided in accordance with an embodiment of the invention, a soft-modem software for running on a processor which handles a plurality of connections which have respective processing cycles, including one or more modules which perform processing sessions of the plurality of connections, a session being performed for each connection once during a respective processing cycle of the connection, and a scheduler which determines an order in which the connections are handled by the processor, estimates one or more times whether the connections will receive a processing session during their current respective processing cycle and, if necessary, schedules one or more of the connections to perform a limited processing session, such that substantially all the connections will receive a processing session during their current respective processing cycle.

Optionally, the scheduler estimates whether the connections will receive a processing session during their current respective processing cycle each time a different connection is processed by the processor. Alternatively or additionally, the scheduler estimates whether the connections will receive a processing session during their current respective processing cycle at lest once in each processing cycle. Possibly, the scheduler changes the order in which the connections receive processing sessions responsive to the scheduling of a limited processing session.

There is further provided in accordance with an embodiment of the invention, a method of assigning a processor to handle a plurality of connections, including determining a maximal processing power required for handling each of a plurality of connections, and assigning the processor to handle a group of connections for which the sum of maximal processing power required is above a processing power ability of the processor.

Optionally, assigning the processor to handle a group of connections includes assigning a group of which the total average required processing power of the connections in the group is lower than the processing power ability of the processing power.

BRIEF DESCRIPTION OF FIGURES

Particular non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EMBODIMENTS

Figure 1:
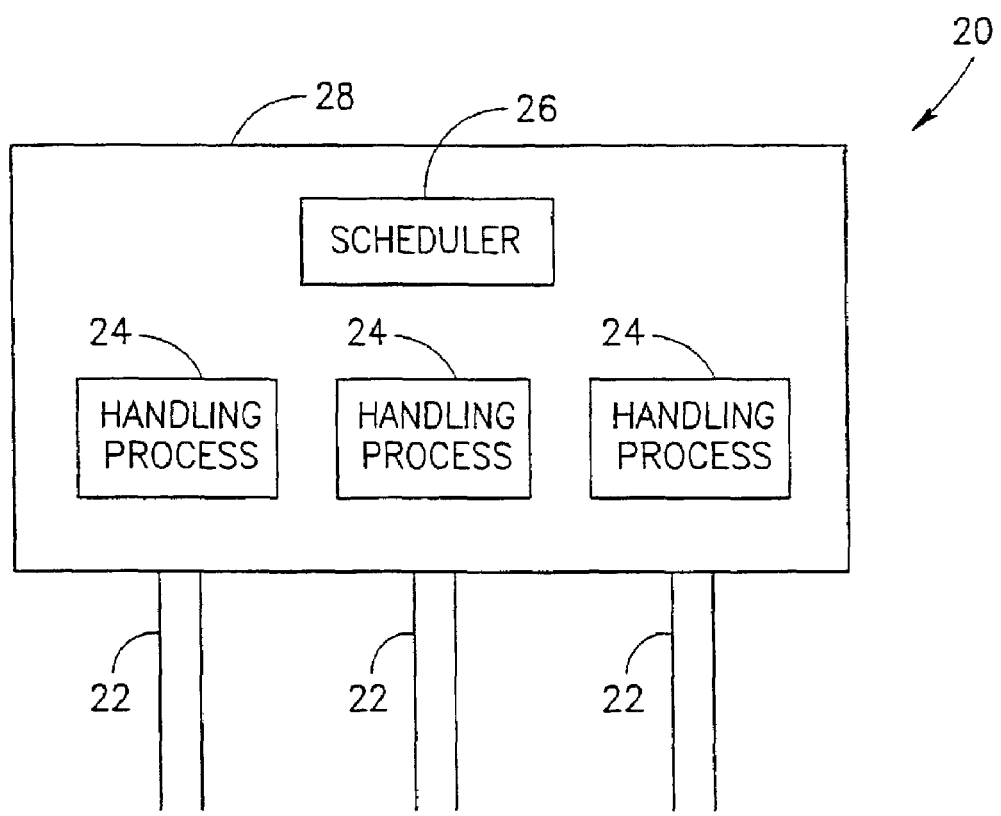
FIG. 1 is a schematic illustration of a multi-channel processing unit, in accordance with an exemplary embodiment of the present invention.

FIG. 1 is a schematic illustration of a multi-channel processing unit (MCPU) 20, in accordance with an exemplary embodiment of the present invention. MCPU 20 is connected to a plurality of links 22 on which it receives connections which are to be handled by the MCPU. MCPU 20 generally converts signals (e.g., voice, fax, modem) received on the connections into packets. Optionally, MCPU 20 also convert packets for transmission on the connection into appropriate signals. For each received connection, MCPU 20 manages a handling process 24 which periodically manipulates the signals of the connection. MCPU 20 comprises a processor 28, for example a digital signal processor (DSP) which executes the handling processes 24 of the received connections. A scheduler 26 sets the processing order of the handling processes 24 on processor 28.

In some embodiments of the invention, the number of connections handled by MCPU 20 is chosen such that, on the average, processor 28 will have sufficient processing power to handle all the tasks of all the handled connections. However, if all the connections require a maximal handling processing power, the processor will not be able to handle all the connections. In some embodiments of the invention, in assigning a group of connections to be handled by MCPU 20, the maximal required processing power is determined for each candidate connection and the group assigned to the MCPU is selected accordingly. Alternatively or additionally, the average required processing power is determined for some or all of the candidate connections. In some embodiments of the invention, the assigning of the connections also takes into account QoS considerations. For example, when only a small amount of processing power is unused on processor 28, only urgent connections and/or connections which may receive low QoS are assigned to the processor. Optionally, the assigning of the connections to MCPU 20 is performed in accordance with the description in an Israel patent application entitled "Channel Load Balancing" filed on Nov. 11, 1999 and assigned Ser. No. 132,888 and/or PCT application PCT/IL00/00703 filed Nov. 1, 2000, the disclosures of which documents is incorporated herein by reference.

Figure 2:
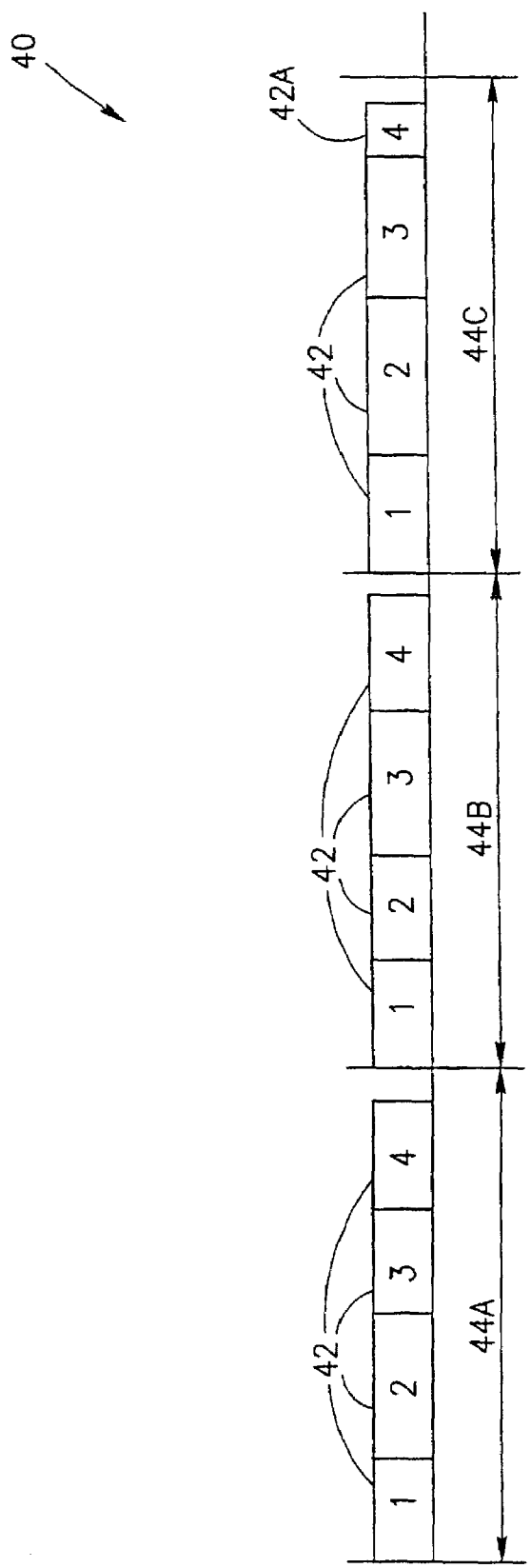
FIG. 2 is a schematic time diagram of an exemplary scheduling of the utilization of a processor of a remote access server, in accordance with an embodiment of the present invention.

FIG. 2 is a schematic time diagram 40 of an exemplary scheduling of the utilization of processor 28, in accordance with an embodiment of the present invention. In some embodiments of the invention, during a predetermined time cycle 44 (marked 44A, 44B and 44C in FIG. 2), each of the handling processes 24 of the connections currently handled by MCPU 20 receives a processing session 42. It is noted that different connections may require processing sessions 42 of different lengths. The length of the processing session 42 may depend, for example, on the type of the connection (e.g., voice, modem, fax) and/or on the signal rate of the connection. It is further noted that the length of processing session 42 of a specific connection may change between time cycles 44, for example, due to changes in the types and/or rates of the connections and/or temporary changes of the specific data transmitted. In addition, the length of the processing sessions 42 depend on which tasks are performed in handling the connection, i.e., whether all the required tasks are performed or one or more of the tasks are not performed due to a lack of processing time as described hereinbelow.

Generally, as illustrated in time cycles 44A and 44B, the length of the time cycles is sufficient to provide all the connections handled by MCPU 20 with processing sessions 42 of unlimited lengths, i.e., in which processor 28 handles the connections without limitations on the processing power utilized in the handling. Thus, in processing sessions 42 with unlimited lengths, processor 28 performs the usual tasks of MCPU 20 in handling connections without shutting down, by-passing and/or simplifying, the operation of one or more of the modules normally performed in handling the connection. However, as illustrated in time cycle 44C, in some cases, for example due to a momentary increase in the power utilization of one or more of the connections, the power utilization of one or more of the connections is limited so as to shorten one or more processing sessions 42 (labeled 42A) and thus ensure that the processing sessions 42 of all the connections handled by MCPU 20 are handled within time cycle 44. It is noted, that the prior art prevents such occurrences from happening by limiting the number of connections handled by MCPU 20, for example, for the setup of FIG. 2 only three connections (1, 2, 3) would be handled by MCPU 20.

Figure 3:
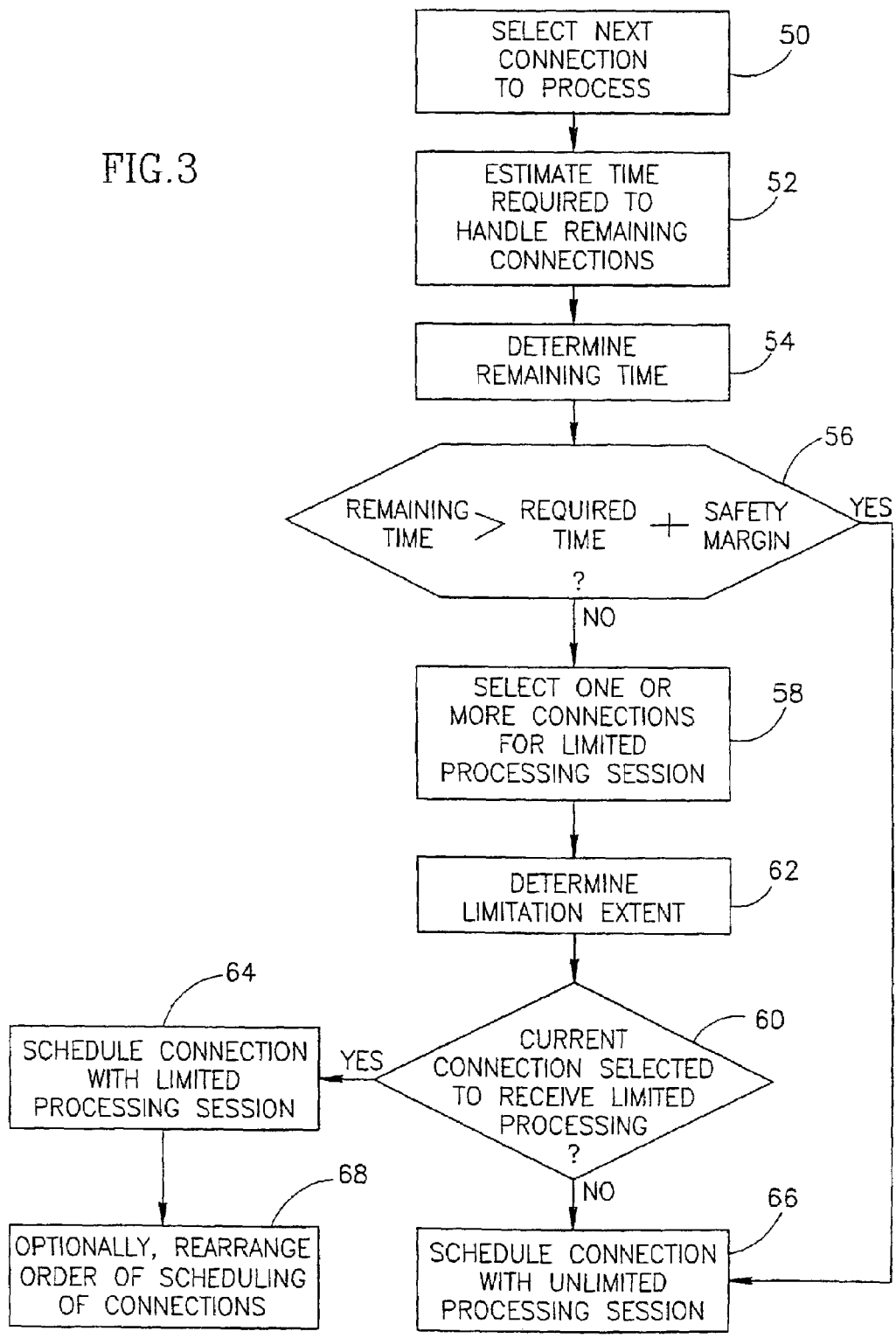
FIG. 3 is a flowchart of the acts performed by a scheduler of a multi-channel processing unit, in accordance with an exemplary embodiment of the present invention.

Reference is also made to FIG. 3 which is a flowchart of the acts performed by scheduler 26 during a time cycle 44, in accordance with an exemplary embodiment of the present invention. Each time processor 28 completes a processing session 42 of a connection, scheduler 26 selects (50) a next connection to have a processing session 42. The selection of the next connection to receive a processing session 42 may be performed after the previous processing session is completed, during the previous processing session and/or one or more processing sessions 42 before the selected connection receives the processing session 42. In some embodiments of the invention, scheduler 26 generally selects the connections according to a predetermined order, for example, according to the order in which the connections were established.

Figure 4:
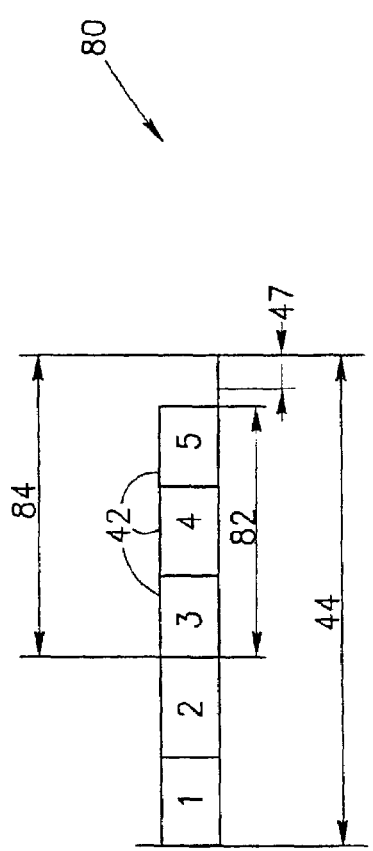
FIG. 4 is a schematic time diagram of an exemplary scheduling of the utilization of a processor, in accordance with an embodiment of the present invention.

Reference is also made to FIG. 4 which is a schematic time diagram 80 of an exemplary scheduling of the utilization of processor 28, in accordance with an embodiment of the present invention. Optionally, each time a selection is performed, scheduler 26 estimates (52) the required time 82 of the processing sessions 42 of all the connections which did not receive a processing session 42 in the current time cycle 44, assuming that all the connections receive an unlimited processing session. In addition, scheduler 26 determines (54) the time 84 remaining to the end of the current time cycle 44. If (56) the estimated required time 82 together with a safety margin 47 is greater than the remaining time, scheduler 26 selects (58) one or more connections to receive a limited processing session 42A, as described hereinbelow. Optionally, scheduler 26 also determines (62) the extent of the limitation of the processing session, e.g., the number of tasks not performed, the method of time reduction and/or the maximal time which the processing should take. If (60) the connection currently receiving a processing session was selected (58) to receive a limited processing session, the connection is scheduled (64) with instructions in accordance with the extent of the limitation of its processing session. In some embodiments of the invention, the limited processing does not cause the other end of the connection to disconnect the connection. Alternatively or additionally, the limited processing is not noticed by the other end apparatus of the connection, except possibly due to a retrain or retransmission request initiated by MCPU 20. If (60) the connection currently receiving a processing session was not selected (58) to receive a limited processing session, or the required time is lower than the sum of the remaining time and the safety margin, the current connection is scheduled (66) for processing with an unlimited processing session.

In some embodiments of the invention, the procedure of FIG. 3 is repeated each time a connection is selected for processing. Alternatively, the procedure of FIG. 3 is performed only for some of the connections scheduled during a current time cycle 44. In some embodiments of the invention, the procedure of FIG. 3 is performed periodically every few processing sessions 42 and/or according to a predetermined determination scheme. Optionally, the procedure of FIG. 3 is performed only after half (or any other percentage) of the connections were handled during each time cycle 44. Alternatively or additionally, the procedure of FIG. 3 is not performed toward the end of time cycles 44 when it is clear the remaining time 84 is sufficient to handle all the remaining connections without assigning limited processing sessions, e.g., the remaining time 84 is sufficient for the maximal required time of all the remaining connections.

Figure 5:
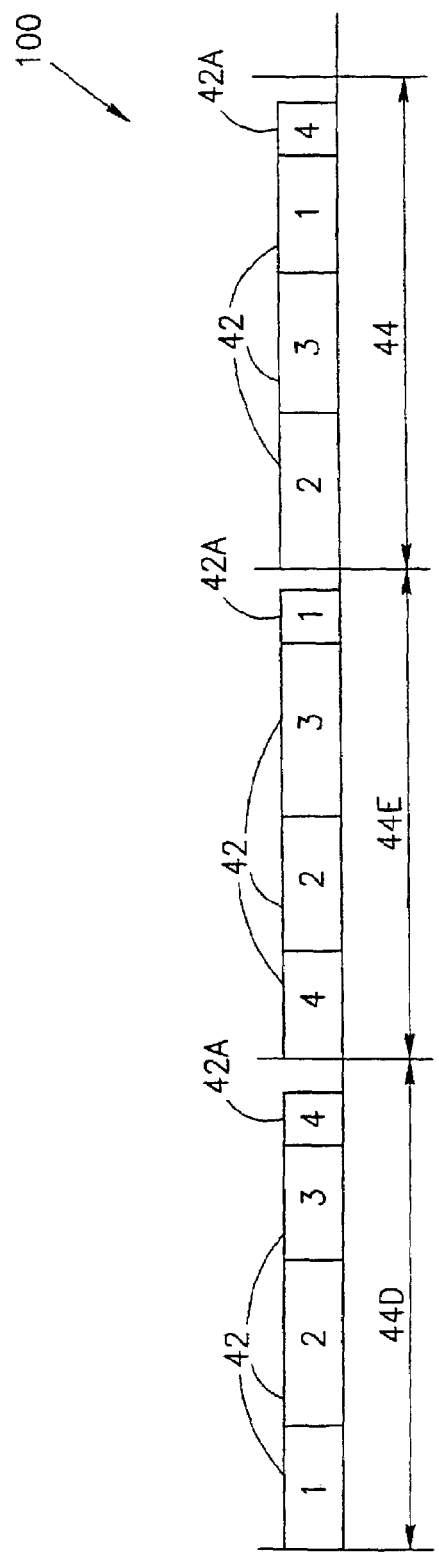
FIG. 5 is a schematic time diagram of an exemplary scheduling of the utilization of a processor, in accordance with an embodiment of the present invention.

Reference is also made to FIG. 5 which is a schematic time diagram 100 of an exemplary scheduling of the utilization of processor 28, in accordance with an embodiment of the present invention. Optionally, at the end of some or all time cycles 44, scheduler 26 rearranges (68) the order of scheduling of the connections, such that if scheduling of a limited processing session to one or more of the connections is required, it is possible to distribute the inconvenience of such scheduling over a larger number of connections. Alternatively or additionally, at the beginning of some time cycles 44, scheduler 26 determines which connections should receive limited processing sessions, if necessary, and accordingly the connections are ordered by scheduler 26. As is shown in FIG. 5, in a first time cycle 44D the order of handling connections is 1, 2, 3 and 4 due to lack of processing power, connection 4 receives a limited processing session 42A. Thereafter, scheduler 26 rearranges (68, FIG. 3) the connections, such that in a next cycle 44E, the order of the connections is 4, 2, 3 and 1. Due to lack of processing power, connection 1 receives a limited processing session 42A.

Optionally, safety margin 47 (FIG. 4) is a small time period which compensates for inaccuracies in the estimation (52, FIG. 3). In some embodiments of the invention, safety margin 47 is determined as a function of the quality of the estimation (52) of the required time, such that the probability that the processing sessions 42 of a time cycle 44 require more time than the length of the cycle is substantially zero. Optionally, the quality of the estimation is determined based on a comparison of previous estimations to the respective actual times of the processing sessions. Optionally, the length of safety margin 47 may be configured by a system manager of MCPU 20. In some embodiments of the invention, safety margin 47 changes over cycles 44 and/or during a single cycle 44. Optionally, the length of margin 47 is decreased as the point of decision progresses over each cycle 44. In some embodiments of the invention, safety margin 47 is set to zero, i.e., not used.

Referring in more detail to estimating (52) the time required to handle all the connections which did not receive a processing session 42 in the current time cycle 44, in some embodiments of the invention, the time required to handle each connection is estimated based on records of the time required to handle the connection during one or more previous time cycles 44. Alternatively or additionally, the estimation is performed based on general information on the type of the connection, the transmission rate of the connection and/or other specifics of the connections, e.g. the type of vocoder used on a voice connection. Optionally, the estimation is perfected based on a comparison of previous estimations and the actual time utilized.

Referring in more detail to selecting (58) one or more connections to receive a limited processing session, optionally each of the connections is assigned a quality of service (QoS) value, and the selection is optionally performed based on the QoS values of the connections. Optionally, alternatively or additionally, the selection (58) is performed according to the type of the connection such that the damage caused to the connection is minimal. Further optionally alternatively or additionally, the selection (58) is performed responsive to the difference between the required processing time and the remaining time to the end of the current time cycle 44. For example, when there is a large difference, scheduler 26 selects (58) a connection which can stand a large decrease in handling time without disconnecting or severely deteriorating the channel quality, while if there is only a small difference a connection which can stand only a small decrease in processing time, is selected. In some embodiments of the invention, the selection (58) is performed responsive to selections of previous time cycles 44. Optionally, the selection (58) is performed in a manner which distributes the damage suffered by connections due to the limitation on the length of their processing session, between as many as possible connections. Optionally, alternatively or additionally, if, for example, previous selections cause a damage which requires retransmission of data handled during a plurality of processing session 42 of a connection, the same connection is selected, if further processing power limitations are required, over a plurality of consecutive time cycles 44.

Referring in more detail to determining (62) the extent of the limitation of the processing session, optionally the determination is performed using the same considerations as described above for selecting the connection to receive a limited processing session.

In some embodiments of the invention, limiting the processing session of a connection comprises reducing the processing power utilization of the reception portion of the connection. Alternatively or additionally, limiting the processing session of a connection comprises reducing the processing power utilization of the transmission portion of the connection. Optionally, the limiting of the processing session comprises not performing one or more tasks performed in unlimited sessions of the connection. In some embodiments of the invention, limiting the processing session of a modem connection comprises not performing one or more of the tasks of the decoding layer of the data pump (for example, in the V.34 the Viterbi decoder, shell dewrapper, deprecoder, non-linear decoder and/or descrambler). Alternatively or additionally, limiting the processing session of a modem connection comprises not performing the tasks of the datapump and/or the ECDC layers. In some embodiments of the invention, limiting the processing session of a fax connection comprises not performing the tasks of the data pump and/or protocol layers. In some embodiments of the invention, limiting the processing session of a voice connection comprises ignoring a certain percentage of received signals and/or not performing the tasks of the vocoder. In some embodiments of the invention, limiting of the processing session comprises changing one or more parameters of the handling, for example, reducing the length of a filter used and/or changing from soft decision to hard decision.

Alternatively or additionally, limiting the processing session is performed in accordance with any of the methods described in U.S. Pat. No. 5,995,540 to Draganic and/or in U.S. patent application Ser. No. 08/969,981 to Abraham Fisher et al. filed Nov. 13, 1997, the disclosures of which documents is incorporated herein by reference.

In some embodiments of the invention, if limitation of the length of one or more processing sessions occurs repeatedly and/or for a large percentage of times within a short period, scheduler 26 attempts to reduce the processing load of MCPU 20. Optionally, scheduler 26 attempts to reduce the number of connections handled by MCPU 20. Alternatively or additionally, MCPU 20 renegotiates the transmission rate on one or more of the connections handled in order to reduce the transmission rate. Alternatively or additionally on voice connections MCPU 20 renegotiates the voice coder used to one which is less processing power demanding.

The above description assumes that all the connections handled by MCPU 20 should receive at least one processing session during a single time cycle. It is noted, however, that this assumption is not required in order to carry out the invention. Rather, one or more connections handled by MCPU 20 may have a separate processing cycle in which they must receive a processing session. In determining whether one of the connections should receive a shortened processing session, scheduler 26 estimates for each of the connections whether the connection will receive a processing session during its respective current processing cycle. Optionally, a processor time cycle which is an integer multiple of the processing cycles of the connections is managed and each specific processing cycle ends at the end of the processor time cycle. In some such embodiments of the invention, the order of scheduling of the connections is performed as described in U.S. patent application titled "Scheduling in a Remote-Access Server, filed Feb. 9, 2000 and awarded Ser. No. 09/501,078, the disclosure of which is incorporated herein by reference.

The above described access control methods may be used for substantially any types of connections, such as voice, fax and modem connections. The modem connections may be of any type known in the art, including but not limited to, point to point connections, connections of clients to an Internet service provider (ISP), connections of clients to a banking remote server, or connections of workers from their homes to a computer at their workplace.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method of scheduling a processor to handle a plurality of connections with respective processing cycles, a handling processing session required to be performed for each connection once during a respective processing cycle of the connection, comprising:
   assigning the processor to handle a group of connections for which the sum of maximal processing power required is above a processing power ability of the processor;
   estimating, for at least one of the connections, whether the connection will receive a processing session during its current respective processing cycle if each of the connections which did not yet receive a processing session during its current processing cycle receives, during its current processing cycle, an unlimited processing session; and
   scheduling one or more of the connections that did not yet receive a processing session in their respective processing cycle, to perform a limited processing session, responsive to results of the estimation.

2. A method according to claim 1, wherein estimating whether a connection will receive a processing session during its current respective processing cycle comprises estimating a processing time required in a single session during a current respective processing cycle, for each of the connections which did not yet receive a processing session.

3. A method according to claim 2, wherein estimating the processing time required for each of the connection comprises estimating responsive to types of the connections.

4. A method according to claim 2, wherein estimating the processing time required for each of the connections comprises estimating responsive to an actual time consumed by the connection in a previous processing cycle.

5. A method according to claim 2, wherein the scheduling of one or more of the connections to perform a limited processing session is performed such that the at least one of the connections will receive a processing session during its current respective processing cycle.

6. A method according to claim 1, wherein substantially all the connections handled by the processor have a common processing cycle, in which they should each receive a processing session.

7. A method according to claim 1, comprising managing a processor time cycle which is an integer multiple of the processing cycles of the connections.

8. A method according to claim 7, wherein estimating whether the connections will receive a processing session during their current respective processing cycle comprises comparing a time remaining to the end of the current processor time cycle to a sum of estimated times required for unlimited processing sessions of the connections which still require service during the current processor time cycle.

9. A method according to claim 8, wherein comparing the time remaining to the end of the current processor time cycle to the sum of required estimated times comprises determining whether remaining time if greater, by at least a given safety margin, than the sum of required estimated times.

10. A method according to claim 9, wherein the given safety margin is a function of the remaining time until the end of the current processor time cycle.

11. A method according to claim 1, wherein scheduling one or more of the connections to perform a limited processing session comprises selecting the one or more sessions to perform a limited processing session responsive to a quality of service indication of the connections.

12. A method according to claim 1, wherein scheduling one or more of the connections to perform a limited processing session comprises selecting the one or more sessions to perform a limited processing session responsive to which connections, if any, received a limited processing session during a previous processing cycle.

13. A method according to claim 12, wherein selecting the one or more sessions to perform a limited processing session comprises selecting a connection which received a limited processing session during a previous processing cycle.

14. A method according to claim 12, wherein selecting the one or more sessions to perform a limited processing session comprises selecting a connection which did not receive a limited processing session during a previous processing cycle.

15. A method according to claim 14, comprising setting an order in which the connections receive processing sessions.

16. A method according to claim 15, comprising changing the order in which the connections receive processing sessions so that a single connection will not receive more than a predetermined number of limited processing sessions within a predetermined period.

17. A method according to claim 1, wherein scheduling one or more of the connections to perform a limited processing session comprises scheduling one or more of the connections to perform a processing session in which one or more of the tasks normally performed in an unlimited processing session of the connection is not performed.

18. A method according to claim 17, wherein the one or more tasks not performed during the limited processing session comprise a task related to signal transmission.

19. A method according to claim 17, wherein the one or more tasks not performed during the limited processing session comprise a task related to signal reception.

20. A method according to claim 17, wherein the one or more tasks not performed during the limited processing session comprise a task of a data pump.

21. A method according to claim 20, wherein the one or more tasks not performed during the limited processing session comprise a task of a decoding layer of a data pump.

22. A method according to claim 17, wherein the one or more tasks not performed during the limited processing session comprise a task of an ECDC layer.

23. A method according to claim 17, wherein not performing one or more tasks during the limited processing session comprises ignoring a percentage of received signals.

24. A method according to claim 1, wherein scheduling one or more of the connections to perform a limited processing session comprises adjusting one or more parameters of the process handling.

25. A method according to claim 24, wherein adjusting one or more parameters comprises reducing the length of a filter used in the processing.

26. A method according to claim 1, wherein assigning the processor to handle a group of connections comprises assigning a group of which the total average required processing power of the connections in the group is lower than the processing power ability of the processing power.

27. A soft-modem software for running on a processor which handles a plurality of connections which have respective processing cycles, the sum of the maximal processing power required by the plurality of connections handled by the processor being above a processing power ability of the processor, comprising:

one or more modules which perform processing sessions of the plurality of connections, a session being performed for each connection once during a respective processing cycle of the connection; and a scheduler which determines an order in which the connections are handled by the processor, estimates one or more times whether the connections will receive a processing session during their current respective processing cycle and, if necessary, schedules one or more of the connections to perform a limited processing session, such that substantially all the connections will receive a processing session during their current respective processing cycle.

28. A software according to claim 27, wherein the scheduler estimates whethe r the connections will receive a processing session during their current respective processing cycle each time a different connection is processed by the processor.

29. A software according to claim 27, wherein the scheduler estimates whether the connections will receive a processing session during their current respective processing cycle at lest once in each processing cycle.

30. A software according to claim 27, wherein the scheduler changes the order in which the connections receive processing sessions responsive to the scheduling of a limited processing session.

31. A method of assigning a processor of a multi-channel processing unit (MPCU) to handle a plurality of connections, comprising:

determining a maximal processing power required for handling each of a plurality of connections, the handling including performing MPCU tasks; and assigning the processor to handle a group of connections for which the sum of maximal processing power required is above a processing power ability of the processor.

32. A method according to claim 31, wherein assigning the processor to handle a group of connections comprises assigning a group of which the total average required processing power of the connections in the group is lower than the processing power ability of the processing power.

33. A method according to claim 31, comprising estimating, for at least one of the connections, whether the connection may not receive a processing session during a respective processing cycle of the connection, due to the assigning of the processor to handle the group of connections for which the sum of maximal processing power required is above a processing power ability of the processor.

34. A method according to claim 31, comprising scheduling one or more of the connections to perform a limited processing session, when required due to the assigning of the processor to handle the group of connections for which the sum of maximal processing power required is above a processing power ability of the processor.

* * * * *